Patented Nov. 9, 1937

2,098,836

UNITED STATES PATENT OFFICE 2,098,836

INSECTICIDE

Ivan L. Ressler, Niagara Falls, N. Y., assignor to E. I. du Pont de Nemours & Company, Wilmington, Del., a corporation of Delaware No Drawing. Application April 24, 1936, Serial No. 76,264

7 Claims. (Cl. 167—34)

This invention relates to the preparation and employment of insecticidal sprays, especially for agricultural and horticultural purposes and more particularly to the preparation and use of nicotine sprays.

Insecticidal spray compositions containing some form of the alkaloid, nicotine, have long been used, especially in horticultural work. Such sprays usually consist essentially of dilute aqueous solutions of nicotine sulfate. Various nicotine-containing preparations useful as insecticides may be made from tobacco. Nicotine, as well as its chemical compounds, as commonly used in insecticidal preparations, is fairly volatile and for this reason, the toxic effect of a nicotine spray ceases within a relatively short time after its application. For example, the usual nicotine sulfate spray becomes practically ineffective within around 24 hours of its application, the exact time depending upon atmospheric conditions such as temperature and the initial concentration of the nicotine. Hence, if a complete kill of the infesting insects is not obtained within the effective time, one or more following treatments are required to complete the kill. A method for increasing the effective toxic period of a nicotine spray would be valuable in increasing its effectiveness and decreasing the number of following treatments to obtain a complete kill of insects susceptible to this poison at a given period of the season.

An object of the present invention is to provide an improved nicotine-containing insecticidal spray material. A further object is to increase the period of time over which a nicotine spray is effective as an insecticide. Other objects will be apparent from the following description of my invention.

The above objects are attained in accordance with my herein described invention by incorporating a hydrophilic polyvinyl compound in a water-base insecticidal spray composition which contains an effective form of nicotine, e. g., nicotine sulfate.

By the term "hydrophilic polyvinyl compound" as used herein and in the appended claims, I means those polymers of vinyl compounds which are water soluble or are capable of swelling by water absorption, or both. This includes polyvinyl alcohol and "partial" derivatives of polyvinyl alcohol such as the esters, ethers or acetals thereof in which unreacted vinyl alcohol hydroxy groups occur. For example, such partial acetal may be made by condensing an aldehyde with an excess of polyvinyl alcohol, to give a product which has partly the characteristics of a completely converted acetal and partly the properties of polyvinyl alcohol. Similarly, a partial ester of polyvinyl alcohol may be made by only partially esterifying the alcohol polymer. Such polyvinyl compounds, as well as polyvinyl alcohol, are well known and need not be more fully described here.

I have discovered that by adding a small amount of polyvinyl alcohol or other hydrophilic polyvinyl compound to an aqueous nicotine spray, the tendency for the nicotine to volatilize is greatly reduced, without any substantial diminution of the toxic action of the nicotine. By this means, the time over which the nicotine spray is effective as an insecticide is markedly increased. In addition to this increase of toxic period, the polyvinyl compounds act as excellent spreading and sticking agents, thus further increasing the effectiveness of the spray. If desired, other insecticides, soluble or insoluble may be added to the nicotine spray of my invention.

In one method of practicing my invention, I may dissolve nicotine sulfate or other suitable form of nicotine in water in the usual amounts and add thereto a small amount of polyvinyl alcohol. The amount of polyvinyl alcohol or similar hydrophilic polyvinyl compound may vary over a wide range, but should not be less than about 0.1% by weight of the aqueous spray for effective results. I prefer to use around 0.2 to 2.0% of polyvinyl alcohol. Larger amounts may be used if desired, but I prefer to use not more than about 2.0% of the polyvinyl compound in a spray solution, since larger amounts tend to unduly increase the viscosity of the spray so as to interfere with the operation of the ordinary spraying equipment.

The effectiveness of polyvinyl alcohol in retarding the volatilization of nicotine from a horticultural spray solution is illustrated by the following example:

Example

A spray solution was made up by dissolving 1 part of a commercial nicotine sulfate preparation known as "Black Leaf 40" in 1000 parts of water. Two equal portions of this solution were placed in two containers and 0.2% by weight of polyvinyl alcohol was dissolved in one portion. Then, for a period of 36 hours, a rapid stream of air was bubbled through the solution in each container simultaneously, the rate of air flow being the same for each. Every 6 hours portions of the solutions were removed and sprayed onto groups of black chrysanthemum aphids and the number of aphids killed determined. The results obtained are tabulated below:

*Percentage of aphids killed*

| Time | Nicotine spray | Nicotine spray containing polyvinyl alcohol |
|---|---|---|
| *Hours* | *Percent* | *Percent* |
| 6 | 83 | 81 |
| 12 | 85 | 85 |
| 18 | 85 | 87 |
| 24 | 84 | 96 |
| 30 | 76 | 93 |
| 36 | 68 | 91 |

The hydrophilic polyvinyl compounds may be incorporated in nicotine-containing insecticidal compositions in various ways. Instead of adding polyvinyl alcohol to the aqueous solution of nicotine as above described, the polyvinyl compound may be added to nicotine or a concentrated nicotine preparation in suitable proportions and this mixture added to water to make the spraying liquid. If desired, insecticides other than nicotine or fungicides may be incorporated in the spray; if insoluble poisons, e. g., lead arsenate are thus added, the spreading and sticking properties of the polyvinyl compound are of further advantage.

A further advantage of my herein described nicotine spray solutions is that when the solution becomes dry after spraying on foliage, the polyvinyl compound tends to form a film which is considerably less soluble in water than the polyvinyl compound originally added. Although relatively insoluble, this film will absorb water to become "swelled". The formation of this relatively insoluble film acts to protect the nicotine, especially from the washing action of rain, thus further insuring the effectiveness of the poison over an extended period of time.

I claim:

1. An insecticidal composition containing nicotine and a hydrophilic polyvinyl compound.

2. An insecticidal composition containing nicotine and polyvinyl alcohol.

3. An insecticidal spray composition comprising an aqueous solution of nicotine and polyvinyl alcohol.

4. An insecticidal spray composition comprising an aqueous solution of nicotine sulfate which contains a hydrophilic polyvinyl compound.

5. An insecticidal spray composition comprising an aqueous solution of nicotine sulfate which contains polyvinyl alcohol.

6. An insecticidal spray composition comprising an aqueous solution of a nicotine compound and not less than about 0.1% of a hydrophilic polyvinyl compound.

7. An insecticidal spray composition comprising an aqueous solution of nicotine sulfate and about 0.2 to 2.0% of polyvinyl alcohol.

IVAN L. RESSLER.